Sept. 10, 1940.     T. E. BROOKS     2,214,268
MAGNETIC PLUG
Filed June 1, 1937
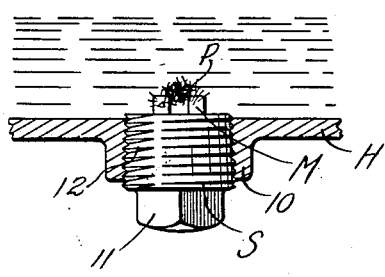
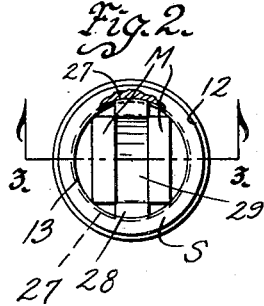
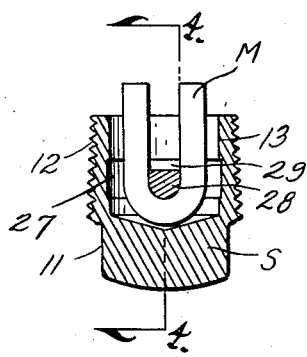
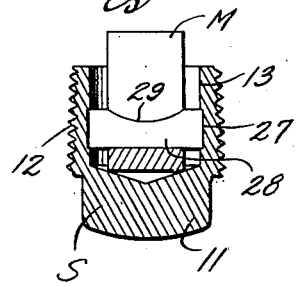
Inventor
Thomas E. Brooks
by Bair & Freeman
Attorneys Patented Sept. 10, 1940

2,214,268

UNITED STATES PATENT OFFICE 2,214,268

MAGNETIC PLUG

Thomas E. Brooks, Clarinda, Iowa, assignor to Lisle Corporation, Clarinda, Iowa, a corporation of Iowa Application June 1, 1937, Serial No. 145,825

1 Claim. (Cl. 209—215)

One of the most important objects of my present invention is to provide simple and inexpensive means for securing a bifurcated magnetic core within the recess of a pluglike shell to thereby provide a magnetic plug adapted for insertion in the lubricant opening of a gear housing or the like.

Still a further object is to provide a fastening means, which extends through the magnetic core and serves to effectively secure the magnetic core in the shell against accidental displacement therefrom.

Still a further object is to secure a magnet in a shell or body, so that it will operate efficiently to attract particles of broken gears and other steel or ferrous particles within the housing, such housings being ordinarily partially filled with oil or grease to lubricate the gears and other mechanism housed therein.

A further object is to provide fastening means for a magnet relative to a plug or body, which does not necessitate drilling a hole or forming other openings in the magnetic cores, which are of extremely hard material and difficult to machine without affecting their magnetic properties.

With these and other objects in view, my invention consists in the construction, arrangement and combination of the various parts of my magnetic plug, whereby the objects contemplated are attained, as hereinafter more fully set forth, pointed out in my claim, and illustrated in the accompanying drawing, in which:

Figure 1 is a sectional view through the lubricant opening boss of a transmission or other type of gear housing, showing my plug installed relative thereto.

Figure 2 is a plan view of my invention, using a cross pin to retain the magnetic core in position.

Figure 3 is a sectional view on the line 3—3 of Figure 2; and

Figure 4 is a sectional view on the line 4—4 of Figure 3.

On the accompanying drawing, I have used the reference character H to indicate a housing, such as one for transmission of differential gears or the like.

The housing H is provided with a boss 10 which may be utilized for receiving a drain plug or a plug which can be removed for introducing lubricant into the housing H depending, of course, on the installation.

Also various housings for different types of machinery may be provided for the boss 10, specifically to receive magnetic plugs of the type disclosed for the purpose of attracting small metallic parts in the housing and preventing them from entering gear teeth or other mechanism.

My plug comprises a shell S and a magnet M. The shell S has an integral nut portion 11 for removing and positioning the shell relative to the boss 10. The shell has a threaded portion 12 for engagement with the threads of the boss 10.

Within the shell S, I provide a recess 13, which is of such size relative to the magnet M that the magnet may fit snugly therein, as best illustrated in Figure 2.

The shell S may be made of metal of any kind. For instance, brass is suitable, although cast iron or the like can be used.

Preferably the poles of the magnet M extend slightly beyond the upper end of the shell S so that the strongest magnetic field is thus in position to readily attract particles P from the oil 15 in the housing H as shown in Figure 1.

To retain the magnet M assembled in the shell S, the shell is provided with opposite notches or a peripheral groove 27 and a deformable bar 28 retains the magnet in position. This bar may be formed of lead or the like and may be initially short enough to enter the recess 13, but when deformed by hammering a depression 29 therein, it expands in length, so as to engage in the opposite walls of the shell. The bar will thereafter remain in position against displacement and will retain the magnet in its desired position.

A plug assembled in this manner is obviously quite inexpensive and affords a practical method for securing a magnetic core within a shell or body to provide a magnetic plug unit for gearing housings or the like.

Some changes may be made in the arrangement and construction of the various parts of my magnetic plug without departing from the real spirit and purpose of my invention, and it is my intention to cover by my claim, any modified forms of structure or use of mechanical equivalents, which may be reasonably included within its scope.

I claim as my invention:

A magnetic plug for a gear housing or the like having an opening therein comprising a body for positioning in said opening and having at its outer end means to remove and position the same, said body having an open recess in its inner end, said recess being enlarged at a point spaced from said inner end of said body, a bifurcated magnetic core received in said recess, and means to retain said magnetic core in said recess comprising a bar of deformable material between the poles thereof, said material extending into the enlarged portion of said recess and due to deformation of said bar, pressing against the cross piece of said magnet and urging it toward the bottom of said recess.

THOMAS E. BROOKS.